(12) United States Patent
Jabri et al.

(10) Patent No.: US 10,703,141 B2
(45) Date of Patent: Jul. 7, 2020

(54) PNEUMATIC VEHICLE TIRE HAVING A TREAD

(71) Applicant: Continental Reifen Deutschland GmbH, Hannover (DE)

(72) Inventors: Mohamed Aymen Jabri, Hannover (DE); Viktoria Pavon Sierra, Hannover (DE); Sven Kastens, Barsinghausen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 422 days.

(21) Appl. No.: 15/792,334

(22) Filed: Oct. 24, 2017

(65) Prior Publication Data
US 2018/0043736 A1 Feb. 15, 2018

Related U.S. Application Data

(63) Continuation of application No. PCT/EP2016/051473, filed on Jan. 26, 2016.

(30) Foreign Application Priority Data

Apr. 29, 2015 (DE) .................. 10 2015 207 931

(51) Int. Cl.
| | |
|---|---|
| *B60C 11/00* | (2006.01) |
| *B29D 30/60* | (2006.01) |
| *B29K 9/06* | (2006.01) |

(52) U.S. Cl.
CPC .......... *B60C 11/0058* (2013.01); *B29D 30/60* (2013.01); *B29K 2009/06* (2013.01);
(Continued)

(58) Field of Classification Search
CPC .................................................. B60C 11/0058
See application file for complete search history.

(56) References Cited

U.S. PATENT DOCUMENTS

| | | | | |
|---|---|---|---|---|
| 4,683,928 A | * | 8/1987 | Yahagi | ............. B60C 11/00 152/209.5 |
| 4,837,266 A | * | 6/1989 | Sattelmeyer | ............. C08J 3/226 523/351 |

(Continued)

FOREIGN PATENT DOCUMENTS

| | | |
|---|---|---|
| EP | 0875367 A2 | 11/1998 |
| JP | 2009000871 A | 1/2009 |

OTHER PUBLICATIONS

Machine Translation of JP 2009-000871, 2020 (Year: 2020).*
(Continued)

*Primary Examiner* — Liam J Heincer
(74) *Attorney, Agent, or Firm* — David L. Cate; Gregory Adams

(57) ABSTRACT

Disclosed are pneumatic vehicle tires and methods of their production, the tires comprising a tread that has a tread segment arranged radially on the outside, and a material strip that is arranged helically in windings approximately in the circumferential direction, wherein, in the region of the tread segment, the material strip has at least two layers in the longitudinal direction of the material strip, wherein the first layer is formed from a first rubber compound and the second layer is formed from a second rubber compound, and wherein the layers connect the radially outer surface to the radially inner surface of the tread segment. The disclosed pneumatic vehicle tire has lower noise emissions and more uniform wear during driving and is improved in respect of at least one conflict of aims.

17 Claims, 3 Drawing Sheets

(52) U.S. Cl.
CPC . *B29K 2995/007* (2013.01); *B60C 2011/0025* (2013.01); *B60C 2011/0091* (2013.01)

(56) References Cited

U.S. PATENT DOCUMENTS

| | | | | |
|---|---|---|---|---|
| 5,370,167 | A * | 12/1994 | Kogure | B60C 9/18 |
| | | | | 152/209.18 |
| 5,931,211 | A * | 8/1999 | Tamura | B60C 1/0016 |
| | | | | 152/209.5 |
| 6,465,560 | B1 * | 10/2002 | Zanzig | B60C 1/0016 |
| | | | | 524/237 |
| 7,559,348 | B2 * | 7/2009 | Puhala | B60C 11/00 |
| | | | | 152/209.18 |
| 8,403,013 | B2 | 3/2013 | Kudo et al. | |
| 8,632,649 | B2 | 1/2014 | Hitotsuyanagi et al. | |
| 9,919,565 | B2 * | 3/2018 | Bourgeois | B60C 11/005 |
| 2002/0033212 | A1 * | 3/2002 | Caretta | B60C 11/18 |
| | | | | 152/209.5 |
| 2005/0167019 | A1 * | 8/2005 | Puhala | B60C 11/00 |
| | | | | 152/209.5 |
| 2007/0017617 | A1 * | 1/2007 | Lafrique | B60C 1/0016 |
| | | | | 152/209.5 |
| 2007/0295433 | A1 * | 12/2007 | Losi | B29D 30/62 |
| | | | | 152/209.5 |
| 2008/0277037 | A1 * | 11/2008 | Yano | B60C 9/20 |
| | | | | 152/209.1 |
| 2010/0018618 | A1 * | 1/2010 | Moorhead | B60C 11/00 |
| | | | | 152/209.5 |
| 2011/0214791 | A1 * | 9/2011 | Ruffenach | B60C 9/08 |
| | | | | 152/527 |
| 2011/0214793 | A1 * | 9/2011 | Ruffenach | B60C 9/2009 |
| | | | | 152/548 |
| 2012/0048434 | A1 * | 3/2012 | Kuroki | B29D 30/60 |
| | | | | 152/152.1 |
| 2012/0180918 | A1 * | 7/2012 | Sandstrom | B60C 11/0066 |
| | | | | 152/209.5 |
| 2013/0048167 | A1 * | 2/2013 | De Monte | B60C 19/082 |
| | | | | 152/152.1 |
| 2013/0126060 | A1 * | 5/2013 | Oblizajek | B60C 11/1637 |
| | | | | 152/209.1 |
| 2014/0190605 | A1 * | 7/2014 | Muhlhoff | B60C 1/0016 |
| | | | | 152/209.5 |
| 2014/0190619 | A1 * | 7/2014 | Imoto | B60C 5/14 |
| | | | | 156/123 |
| 2016/0059636 | A1 * | 3/2016 | Zhao | B60C 11/0058 |
| | | | | 152/209.5 |
| 2016/0214437 | A1 * | 7/2016 | Bourgeois | B60C 11/0302 |
| 2017/0008345 | A1 * | 1/2017 | Gayton | B60C 11/005 |
| 2018/0043736 | A1 * | 2/2018 | Jabri | B29D 30/60 |
| 2018/0126788 | A1 * | 5/2018 | Taniguchi | B60C 11/0058 |
| 2018/0141296 | A1 * | 5/2018 | Jabri | B29D 30/60 |
| 2018/0186192 | A1 * | 7/2018 | Sakata | B60C 11/0058 |
| 2019/0232720 | A1 * | 8/2019 | Prost | B60C 11/0008 |

OTHER PUBLICATIONS

International Search Report dated Apr. 5, 2016 of international application PCT/EP2016/051473 on which this application is based.
DIN53512:Apr. 2000, Apr. 2000, DIN Deutsches Institut fuer Normung e.V., Berlin, Beuth Verlag GmbH, Germany, pp. 1 to 5.
DIN53504, Oct. 2009, DIN Deutsches Institut fuer Normung e.V., Berlin, Beuth Verlag GmbH, Germany, pp. 1 to 19.
DIN ISO 7619-1, Feb. 2012, DIN Deutsches Institut fuer Normung e.V., Berlin, Beuth Verlag GmbH, Germany, pp. 1 to 15 (English) and 1 to 19 (German).

* cited by examiner

PNEUMATIC VEHICLE TIRE HAVING A TREAD

CROSS REFERENCE TO RELATED APPLICATIONS

This application is a continuation application of international patent application PCT/EP2016/051473, filed Jan. 26, 2016, designating the United States and claiming priority from German application 10 2015 207 931.7, filed Apr. 29, 2015, and the entire content of both applications is incorporated herein by reference.

FIELD OF THE INVENTION

Disclosed is a pneumatic vehicle tire having a tread, wherein the tread has a tread segment that is arranged radially on the outside, wherein the tread segment has a material strip that is arranged helically in windings approximately in the circumferential direction, wherein, in the region of the tread segment, the material strip has at least two layers in the longitudinal direction of the material strip, wherein the first layer is formed from a first rubber compound and the second layer is formed from a second rubber compound, different from the first, wherein the first layer and the second layer connect the radially outer surface of the tread segment to the radially inner surface of the tread segment. The invention furthermore relates to a method for producing a pneumatic vehicle tire of this kind.

BACKGROUND OF THE INVENTION

Different demands are made on the treads of a pneumatic vehicle tire. Since the tread is in direct contact with the roadway, it is important that the radially outer surface of the tread has advantageous properties in respect of adhesion, grip and braking properties for the entire duration of use. Moreover, good handling properties, a low rolling resistance and low noise emissions are advantageous. In the case of tires which are to be used in winter driving conditions, advantageous properties in respect of handling on snow, dry handling, wet braking properties, cornering stiffness and rolling resistance should be ensured.

In general, it is not possible to embody treads in such a way in respect of these properties that all the properties are improved to an equal extent. Tires, the tread surface of which has regions comprising different rubber compounds, are known.

Thus, U.S. Pat. No. 8,403,013 discloses a tire which has a tread region arranged radially on the outside which is formed from a material strip having two layers of different rubber compounds, wherein one compound is of electrically conductive configuration and the other compound is not of electrically conductive configuration. Here, the volume ratio of electrically conductive compound in the material strip is lower in the axial center of the tread than in the shoulder region. A tread of this kind is produced by winding an extruded multilayer material strip. A tire of this kind is said to have a low rolling resistance and a capacity for eliminating static charges while having a shorter production cycle time.

A tire of the type stated at the outset is known from EP 0 875 367 A2. Here, the tread segment extends over the entire axial width of the tread, and the rubber compounds of the two layers of the material strip differ in hardness. Through this combination of rubber compounds of different hardness, the tire is supposed to have advantageous adhesion while being simple to produce. However, treads with regions of different hardness have disadvantageous noise emission characteristics and disadvantageous nonuniform wear owing to the difference in the stiffness of these regions.

SUMMARY OF THE INVENTION

Disclosed is a pneumatic vehicle tire that has lower noise emissions and more uniform wear during driving and is exhibits exceptional results in respect of at least one conflict of aims between two further properties. Moreover, the tire is simple to produce.

According to an embodiment, the object is achieved by the fact that, in the vulcanized state, the first rubber compound and the second rubber compound have approximately the same Shore A hardness, determined at room temperature in accordance with DIN ISO 7619-1, the DIN being herein incorporated by reference in its entirety for all purposes, and that, in the vulcanized state, the first rubber compound and the second rubber compound differ in at least one further physical property.

It has been found that the object can be achieved well by means of two layers, the rubber compounds of which have approximately the same Shore A hardness but differ from one another in at least one further physical property. The radially outer surface of the tread segment, which comes into contact with the roadway during driving, is formed or partially formed by the approximately circumferentially wound compound strips having two layers comprising different rubber compounds. The contact surface is thus formed by regions comprising different rubber compounds. In the vulcanized state, the two rubber compounds of the first and the second layer have approximately the same Shore A hardness in this case, as a result of which the tread has lower noise emissions and more uniform wear than is the case with a corresponding tread in which both layers have a different Shore A hardness. "Approximately the same Shore A hardness" should be taken to mean Shore A hardnesses which differ from one another by at most 1.5 Shore A.

At the same time, the first and the second rubber compound differ in at least one further physical property in the vulcanized state, for example, in the rebound resilience thereof or in the stress value thereof at 300% elongation, as a result of which the first and the second rubber compound are improved in respect of different demands. The tread is thereby improved in respect of a conflict of aims between two further properties. It is preferred if the two compounds differ by at least 3%, particularly preferably by at least 10%, in the further physical property, wherein the respectively lower value is taken as 100%.

Since both layers extend over the radial extent of the tread segment, the stated advantages are obtained over the wear life of the tread segment. Since both layers are applied as a material strip, the tire is furthermore distinguished by a simple production process and a production cycle time.

According to one embodiment of the disclosed pneumatic vehicle tires, one or the other property, in particular handling on snow, dry handling, wet braking properties, cornering stiffness and rolling resistance, can be established particularly effectively by means of special configurations described herein.

In respect of the conflict of aims between handling on snow and wet braking properties, in one embodiment the first and second rubber compounds differ by at least 2%, or by at least 5%, in the rebound resilience thereof, if, in this case, the rubber compound with the greater rebound resilience has a rebound resilience of 23% to 75% and if the other rubber compound, that is, the rubber compound with the lower rebound resilience, has a rebound resilience of 8% to 50%, wherein the rebound resilience is in each case determined at room temperature in accordance with DIN 53512, the DIN being herein incorporated by reference in its entirety for all purposes. Here, the rubber compound with the higher rebound resilience relative to the other rubber compound is distinguished by a higher glass transition temperature and accordingly by higher damping, resulting in particularly advantageous wet braking properties. In one embodiment, the first rubber compound is the rubber compound with the greater rebound resilience. In another embodiment, the second rubber compound is the rubber compound with the greater rebound resilience.

An embodiment of the disclosed pneumatic tire, advantageous in respect of the conflict of aims of dry handling versus rolling resistance and cornering stiffness, is obtained if the second rubber compound has a stress value stress value, determined at 300% elongation at room temperature in accordance with DIN 53504, which is higher by at least 1.0 MPa, or by at least 1.5 MPa, than that of the first rubber compound, the DIN being herein incorporated by reference in its entirety for all purposes. In this case, the first rubber compound is distinguished by particularly advantageous dry handling, and the second rubber compound is distinguished by particularly advantageous properties in respect of rolling resistance and cornering stiffness.

In another embodiment of the invention, the first and second rubber compounds each have a Shore A hardness of 48 Shore A to 75 Shore A, in particular of 55 Shore A to 68 Shore A. If the two rubber compounds are embodied with approximately the same hardness within these hardness ranges, the achievable desired properties are particularly clear.

In another embodiment, the interface between the first layer and the second layer has a mean slope angle per winding of −80° to 80° to the radial direction of the pneumatic vehicle tire, the ratio of the volume of the first layer to the volume of the second layer per winding is 1:1 to 10:1, and/or the mean cross-sectional thickness per winding of the first layer and/or the mean cross-sectional thickness per winding of the second layer is 0.5 mm to 5 mm, or 0.5 mm to 1 mm. The mean slope angle of the interface can be adjusted, for example, by means of the degree of overlap between adjacent windings of the material strip and/or by means of the geometry of the layers within the material strip. The mean slope angle per winding is the angle enclosed by the interface and the radial direction, which is averaged over the extent of the interface per winding according to the arithmetic mean. The mean cross-sectional thickness per winding is also averaged according to the arithmetic mean. Any anisotropy in the radial direction and in the axial direction leads to advantageous decoupling of the longitudinal and lateral handling properties. Furthermore, a tire of this kind is distinguished by a high level of tread stability.

It is expedient if the ratio of the volume of the first layer to the volume of the second layer per winding of the material strip is not constant over the entire axial width of the tread but changes in the axial direction. This makes it possible to obtain the desired properties of the tread surface according to the different requirements, in relation to the axial width of the tire.

A particularly advantageous embodiment allows for the different demands on the tread surface in the shoulder region versus a region axially between the shoulder regions in that, in at least one shoulder region, the tread has a tread segment and, axially to the inside relative to the tread segment, a further segment, arranged radially on the outside, of the tread, and in that the volume density of second rubber compound in the further segment is lower than the volume density of second rubber compound in the tread segment, preferably in that the volume density of second rubber compound in the further segment is equal to 0. In one embodiment, both shoulder regions have a tread segment of this kind. The second rubber compound preferably excels in respect of properties that are important especially in the shoulder region, such as rolling resistance and dry handling, and the first rubber compound excels in respect of properties that are important especially in the central region, such as braking properties. Here, a material strip can form or partially form both the tread segment or segments and the further tread segment.

Advantageous decoupling between the longitudinal and lateral handling properties while taking into account the changing requirements in the axial direction is obtained if, within the tread segment, the mean slope angle per winding that is enclosed by the interface between the first layer and the second layer of the material strip and the radial direction changes in the axial direction. In one embodiment, the mean slope angle per winding increases in magnitude from axially on the inside to axially on the outside. A pneumatic vehicle tire of this kind with a relatively steep slope in the shoulder region in comparison with axially inner regions has very good handling.

Particularly advantageous decoupling between the longitudinal and lateral handling properties while taking into account the changing requirements in the axial direction is obtained if the tread has a tread segment in each shoulder region, and if the two tread segments differ in the sign of the mean slope angle thereof per winding that is enclosed by the interfaces between the first layer and the second layer of the respective material strip and the radial direction, or if the mean slope angles per winding increase in magnitude from axially on the inside to axially on the outside.

Positive handling properties, especially positive cornering properties, are also obtained if the tread has a tread segment in each shoulder region, and if the two tread segments differ in the sign of the mean slope angle thereof per winding that is enclosed by the interfaces between the first layer and the second layer of the respective material strip and the radial direction. In this case, the two tread segments can be formed or partially formed by the same material strip. The region axially between the two tread segments in one embodiment has less rubber compound per winding than in the two tread segments or has no rubber compound.

A desired outcome of three or more properties is achieved if the material strip has a third layer composed of a rubber compound different from the first and second rubber compounds. The third layer can but does not have to be arranged on the tread in the region of the tread segment. It is advantageous if the first rubber compound is a conventional cap compound and the second rubber compound is a conventional base compound, and the rubber compound of the third layer, which is different therefrom, is a rubber compound having advantageous rolling resistance properties.

It is expedient if the tread has a material strip comprising electrically conductive material, wherein the electrically conductive material connects the tread surface in an electrically conductive manner to an electrically conductive component arranged radially to the inside of the material strip. An electrically conductive path for the dissipation of static charge radially inwards from the tread surface is thereby created.

For a simple production process with a short cycle time, it is advantageous if the material strip extends over at least 80% of the axial width, preferably over the entire axial width, of the tread. Here, the material strip can comprise a plurality of tread segments.

In an expedient embodiment of the invention, the tread segment extends over the entire radial extent of the tread. In another expedient embodiment, the tread segment forms at least one part of the tread cap and extends over only a part of the radial extent of the tread, which, in the radial direction, has a cap layer arranged radially on the outside and a base layer situated radially on the inside with respect to the latter.

Pneumatic vehicle tires according to one embodiment are suitable, in particular, as tires for motorcars, vans, commercial vehicles, industrial vehicles or motorcycles, in particular for motorcars for use in winter driving conditions.

A particularly simple and advantageous method for producing the disclosed pneumatic vehicle tires is provided by a procedure in which, to form the tread segment arranged radially on the outside, a material strip is wound on approximately helically in the circumferential direction of the pneumatic vehicle tire, the material strip comprises the first layer and the second layer, and the multilayer material strip is extruded by co-extrusion as a material strip or produced by cutting a calendered multi-compound web and joining together the pieces thereby obtained. A production method of this kind ensures a high quality tread segment, even when the layers of the material strip are thin. Moreover, the method is distinguished by the winding of the multilayer material strip over a short cycle time.

BRIEF DESCRIPTION OF THE DRAWINGS

The various embodiments disclosed herein will now be described with reference to the drawings wherein.

DESCRIPTION OF THE PREFERRED EMBODIMENTS OF THE INVENTION

Figure 1:
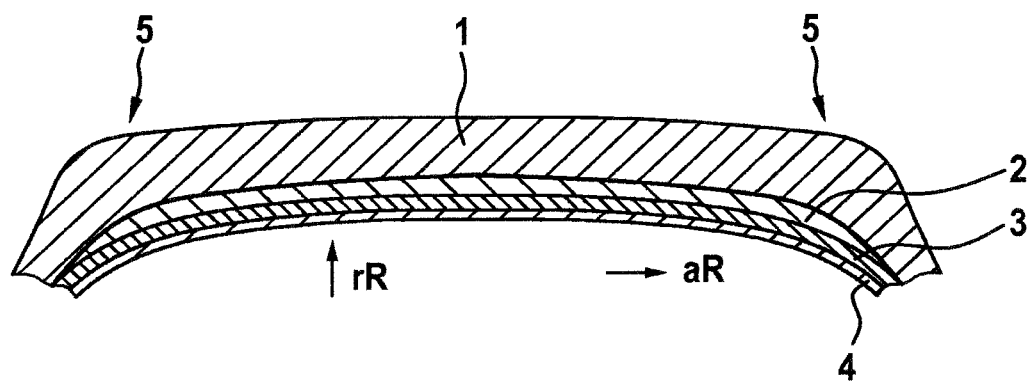
FIG. 1 shows a partial cross section through the tread region of a pneumatic vehicle tire comprising one embodiment.

FIG. 1 shows schematically and by way of example a partial cross section of a motorcar tire. The customary constituent parts of the tire include, in particular, a tread 1, a belt structure 2 arranged radially on the inside of the tread 1 and comprising a plurality of belt plies and optionally a belt bandage, furthermore a radial carcass 3, a largely airtight inner liner 4 and side walls (not shown) as well as bead regions with bead cores, core profiles and further reinforcing plies possibly provided in the bead regions. The tread 1 is provided, in particular in a manner known per se, with profiling, which is not shown.

The tread 1 extends beyond the width of the tire in the ground contact area and ends in the shoulder regions 5. At the shoulders, tread end regions consisting of the side wall compound can be provided.

FIGS. 2 to 6 each show schematically an embodiment of the tread. The embodiments are suitable for a tread 1 of a motorcar tire of the kind illustrated in FIG. 1, in particular for a motorcar tire for use in winter driving conditions.

The treads 1 illustrated in FIGS. 2 to 6 each have a tread segment 6 arranged radially on the outside, wherein the tread segment 6 has a material strip 7, which is arranged helically in windings approximately in the circumferential direction. In the region of the tread segment 6, the material strip 7 has at least two layers 8, 9 in the longitudinal direction thereof, wherein the first layer 8 is formed from a first rubber compound and the second layer 9 is formed from a second rubber compound different from the first compound, wherein the first layer 8 and the second layer 9 connect the radially outer surface 10 of the tread segment 6 to the radially inner surface 11 of the tread segment 6.

The Shore A hardness of the first and second rubber compounds, determined at room temperature in accordance with DIN ISO 7619-1, are 48 Shore A to 75 Shore A, or 55 Shore A to 68 Shore A, and differ from one another by at most 1.5 Shore A, the DIN being herein incorporated by reference in its entirety for all purposes. In the vulcanized state, the first and second rubber compounds furthermore differ in at least one further physical property.

In a first embodiment, each of the treads 1 shown in FIGS. 2 to 6 has a first and a second rubber compound, which differ by at least 2%, preferably by at least 5%, in the rebound resilience thereof, wherein the rubber compound with the greater rebound resilience has a rebound resilience of 23% to 75% and the wherein the other rubber compound has a rebound resilience of 8% to 50%, in each case determined at room temperature in accordance with DIN 53512, the DIN being herein incorporated by reference in its entirety for all purposes. Here, either the first rubber compound or the second rubber compound can be the rubber compound with the higher rebound resilience.

In a second embodiment, each of the treads 1 shown in FIGS. 2 to 6 has a second rubber compound, the stress value of which, determined at 300% elongation at room temperature in accordance with DIN 53504, is higher by at least 1.0 MPa, or by at least 1.5 MPa, than that of the first rubber compound, the DIN being herein incorporated by reference in its entirety for all purposes.

The treads 1 shown are produced at least partially by a procedure in which, to form the tread segment 6 arranged radially on the outside, a material strip 7 is wound on approximately helically in the circumferential direction of the pneumatic vehicle tire, wherein the material strip 7 comprises the first 8 and the second layer 9. In this case, the multilayer material strip 7 is extruded as a material strip, in particular, by co-extrusion, or is produced by cutting a calendered multi-compound web and joining together the pieces thereby obtained.

Figure 2:
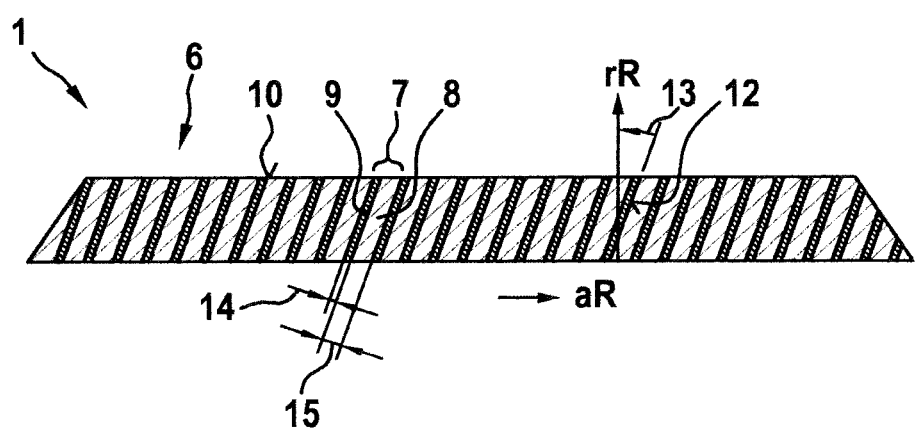
FIG. 2 shows schematically an embodiment of the tread.

FIG. 2 shows a tread 1 which is formed by a material strip 7 arranged helically in windings in the circumferential direction, wherein the material strip 7 is of two-layer configuration over the entire length thereof. The material strip 7 extends over the entire axial width of the tread 1, and the tread segment 6 extends substantially over the entire axial width of the tread 1.

The interface 12 between the first layer 8 and the second layer 9 has a mean slope angle 13 per winding of −80° to 80° to the radial direction rR of the pneumatic vehicle tire. Furthermore, the ratio of the volume of the first layer 8 to the volume of the second layer 9 per winding is 1:1 to 10:1 and the mean cross-sectional thickness 14 per winding of the first layer 8 and/or the mean cross-sectional thickness 15 per winding of the second layer 9 is 0.5 mm to 1 mm.

Figure 3:
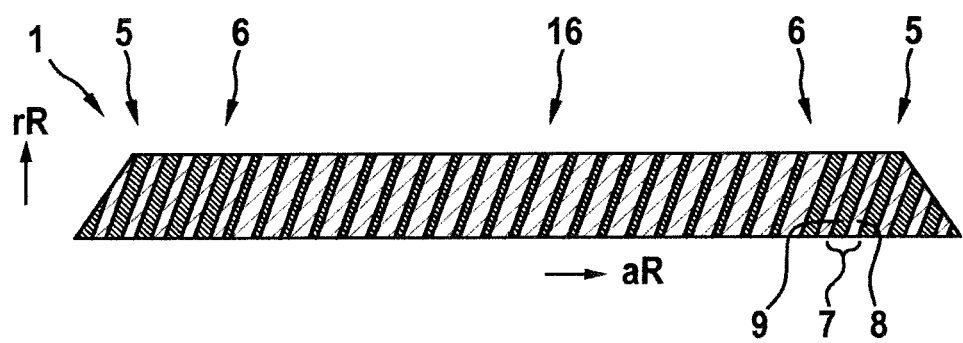
FIG. 3 shows schematically an embodiment of the tread.
Figure 4:
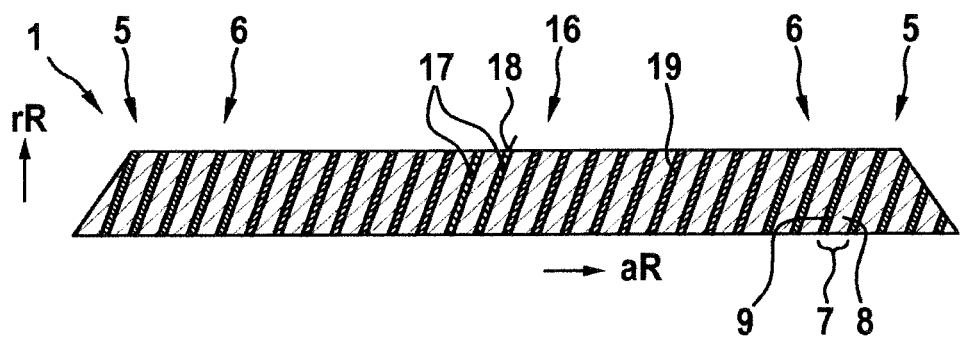
FIG. 4 shows schematically an embodiment of the tread.

FIGS. 3 and 4 each show a tread 1, which has a tread segment 6 in both shoulder regions 5 and, axially to the inside relative to the tread segments 6, a further segment 16, arranged radially on the outside, of the tread 1, wherein the volume density of second rubber compound in the further segment 16 is lower than the volume density of second rubber compound in the tread segments 6.

Here, the illustrative embodiment shown in FIG. 3 also has the second rubber compound in the further segment 16. In particular, segments 6 and 16 are formed from a single material strip 7, wherein the ratio of the volume of the first layer 8 of a winding to the volume of the second layer 9 of the winding of the material strip 7 changes in the axial direction.

In the illustrative embodiment shown in FIG. 4, the volume density of second rubber compound in the further segment 16 is equal to 0. Layer 19 is thus formed from a rubber compound different from the first rubber compound. In particular, the further segment 16 has a material strip comprising electrically conductive material 17, wherein the electrically conductive material 17 connects the tread surface 18 in an electrically conductive manner to an electrically conductive component arranged radially to the inside of the material strip 7. In particular, segments 6 and 16 are formed from different material strips. However, segments 6 and 16 can also be formed from a material strip, the second layer of which is not formed from the second rubber compound in the region of segment 16 but from a rubber compound different therefrom, in particular from the first rubber compound and/or from electrically conductive material 17.

Figure 5:
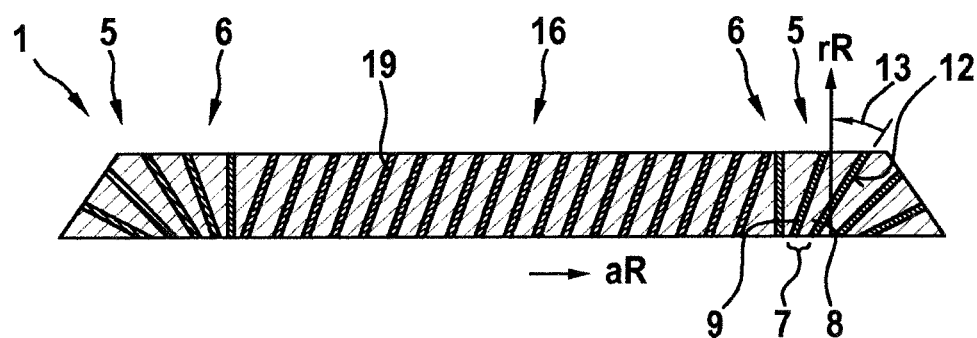
FIG. 5 shows schematically an embodiment of the tread; and,
FIG. 6 shows schematically an embodiment of the tread.
Figure 6:
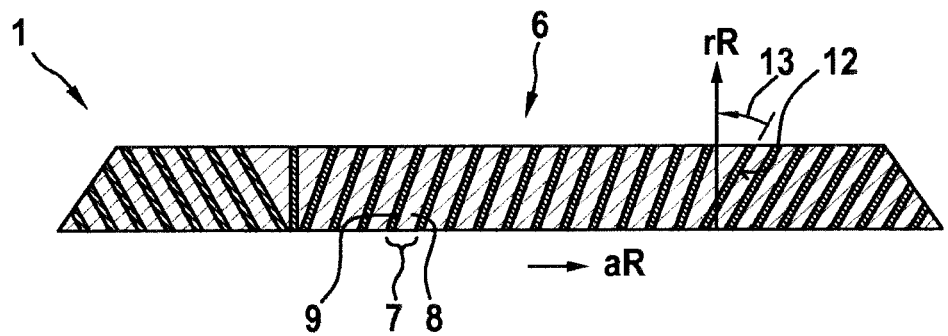

FIGS. 5 and 6 each show a tread 1 having at least one tread segment 6, wherein, within the tread segment 6, the mean slope angle 13 per winding that is enclosed by the interface 12 between the first layer 8 and the second layer 9 of the material strip 7 and the radial direction changes in the axial direction. Moreover, the two shoulder regions differ at least in the sign of the mean slope angle 13 per winding that is enclosed by the interfaces 12 between the first layer 8 and the second layer 9 of the respective material strip 7 and the radial direction.

Here, the tread 1 illustrated in FIG. 5 differs from the tread 1 illustrated in FIG. 4 essentially in that, within the tread segments 6 arranged in the shoulder regions 5, the mean slope angle 13 per winding increases in magnitude from axially on the inside to axially on the outside and in that the two tread segments 6 differ in the sign of the mean slope angle 13 thereof per winding that is enclosed by the interfaces 12 between the first layer 8 and the second layer 9 of the respective material strip 7 and the radial direction.

In particular, the tread 1 illustrated in FIG. 6 is formed from a single material strip 7.

The tread 1 illustrated in FIGS. 2 to 6 can form or partially form substantially the entire tread of a pneumatic vehicle tire or a radially outer region of the tread, in particular the "cap layer".

Tables 1 and 2 below contain examples of rubber compound compositions M11 and M21 for the first layer 8 and rubber compound compositions M12 and M22 for the second layer 9 of the compound strip 7. A compound strip 7 of this kind is suitable, in particular, as a compound strip 7 for the treads 1 illustrated in FIGS. 2 to 6. The quantity data are given in the unit phr (parts per hundred rubber) customary in rubber technology. In each case, the quantity data relate to the proportions by mass of the base polymer or, in the case of polymer blends, to those of the base polymers. Also given are the physical properties of Shore A hardness, determined at room temperature in accordance with DIN ISO 7619-1, and the stress value, determined at 300% elongation at room temperature in accordance with DIN 53504, and the rebound resilience, determined at room temperature in accordance with DIN 53512, the DINs being herein incorporated by reference in their entirety for all purposes.

TABLE 1

| Constituents | Unit | $M1_1$ | $M1_2$ |
|---|---|---|---|
| NR [a] | phr | 4 | 5 |
| BR [b] | phr | 2 | 67 |
| SBR [c] | phr | 41.3 | |
| SBR [d] | phr | | 28 |
| SBR [e] | phr | 88 | |
| Silica [f] | phr | 115 | 127 |
| Carbon black N 399 | phr | 15 | 5 |
| Plasticizer [g] | phr | 35 | 58 |
| Silane [h] | phr | | 15.5 |
| Silane [i] | phr | 9 | |
| Other additives [j] | phr | 14.5 | 11 |
| S and accelerator [k] | phr | 6.8 | 5 |
| Physical properties | | | |
| Shore A hardness | Shore A | 70 | 70 |
| Stress value | MPa | 7.8 | 12.6 |
| Rebound resilience | % | 13 | 35 |

Substances used
[a] Natural rubber TSR
[b] BR: BUNA CB 24, Lanxess
[c] SBR: Intol 1739, Eni
[d] SBR: Sprintan ™ SLR 3402, Styron
[e] SBR: HP755B, JSR
[f] Silica Zeosil ® 1165 MP, Rhodia
[g] Plasticizer Vivatec C500, Thai Base Public Company Ltd.
[h] Silane NXT, Momentive
[i] Silane Si263, Evonik
[j] Other additives: antioxidant 6PPD, zinc oxide, stearic acid
[k] Sulfur and accelerator CBS

TABLE 2

| Constituents | Unit | $M2_1$ | $M2_2$ |
|---|---|---|---|
| NR [a] | phr | 40 | 25 |
| BR [b] | phr | 30 | |
| SBR [c] | phr | 41.25 | |
| SBR [d] | phr | | 75 |
| Silica [e] | phr | 78 | 82 |
| Carbon black N 399 | phr | 5 | 5 |
| Plasticizer [f] | phr | 21 | 11 |
| Silane [g] | phr | 5.6 | |
| Silane [h] | phr | | 8.42 |
| Other additives [i] | phr | 11 | 11 |
| S and accelerator [j] | phr | 5.7 | 4.5 |
| Physical properties | | | |
| Shore A hardness | Shore A | 68 | 68 |
| Stress value | MPa | 7.4 | 13.4 |
| Rebound resilience | % | 33 | 27 |

Substances used
[a] Natural rubber TSR
[b] BR: BUNA CB 24, Lanxess
[c] SBR: Buna VSL 5025-2, Lanxess
[d] SBR: Sprintan ™ SLR 4602, Styron
[e] Silica Ultrasil VN3, Evonik
[f] Plasticizer Vivatec C500, Thai Base Public Company Ltd.
[g] Silane Si263, Evonik
[h] Silane NXT, Momentive
[i] Other additives: antioxidant 6PPD, zinc oxide, stearic acid
[j] Sulfur and accelerator CBS It is understood that the foregoing description is that of the preferred embodiments and that various changes and modifications may be made thereto without departing from the spirit and scope of the invention as defined in the appended claims.

LIST OF REFERENCE SIGNS

Part of the Description

1 Tread
2 Belt structure
3 Radial carcass
4 Inner layer
5 Shoulder region
6 Tread segment
7 Material strip
8 First layer
9 Second layer
10 Radially outer surface of the tread segment
11 Radially inner surface of the tread segment
12 Interface
13 Slope angle
14 Mean cross-sectional thickness of the first layer
15 Mean cross-sectional thickness of the second layer
16 Further segment of the tread
17 Electrically conductive material
18 Tread surface
19 Layer
rR Radial direction
aR Axial direction

What is claimed is:

1. A pneumatic vehicle tire comprising a tread,
wherein the tread comprises a tread segment that is arranged radially on the outside,
wherein the tread segment comprises a material strip that is arranged helically in windings approximately in the circumferential direction,
wherein, in the region of the tread segment, the material strip comprises at least a first layer and a second layer in the longitudinal direction of the material strip,
wherein the first layer of the material strip is formed from a first rubber compound and the second layer of the material strip is formed from a second rubber compound that is different from the first rubber compound,
wherein the first layer of the material strip and the second layer of the material strip connect the radially outer surface of the tread segment to the radially inner surface of the tread segment,
wherein in the vulcanized state, the first rubber compound and the second rubber compound comprise approximately the same Shore A hardness, determined at room temperature in accordance with DIN ISO 7619-1,
wherein in the vulcanized state, the first rubber compound and the second rubber compound differ in at least one additional physical property, and
wherein the first rubber compound and the second rubber compound differ by at least 2% in the rebound resilience thereof, and wherein the rubber compound with the greater rebound resilience has a rebound resilience of 23% to 75% and the other rubber compound has a rebound resilience of 8% to 50%, in each case determined at room temperature in accordance with DIN 53512.

2. The pneumatic vehicle tire of claim 1, wherein the first rubber compound and the second rubber compound differ by at least 5% in the rebound resilience thereof, and wherein the rubber compound with the greater rebound resilience has a rebound resilience of 23% to 75% and the other rubber compound has a rebound resilience of 8% to 50%, in each case determined at room temperature in accordance with DIN 53512.

3. The pneumatic vehicle tire of claim 1, wherein the second rubber compound comprises a stress value, determined at 300% elongation at room temperature in accordance with DIN 53504, that is higher by at least 1.0 MPa than that of the first rubber compound.

4. The pneumatic vehicle tire of claim 1, wherein the second rubber compound comprises a stress value, determined at 300% elongation at room temperature in accordance with DIN 53504, that is higher by at least 1.5 MPa than that of the first rubber compound.

5. The pneumatic vehicle tire of claim 1, wherein the two rubber compounds each comprise a Shore A hardness of 48 Shore A to 75 Shore A.

6. The pneumatic vehicle tire of claim 1, wherein the two rubber compounds each comprise a Shore A hardness of 55 Shore A to 68 Shore A.

7. The pneumatic vehicle tire of claim 1, wherein within the tread segment the interface between the first layer of the material strip and the second layer of the material strip comprise a mean slope angle per winding of 80° to 80° to the radial direction rR of the pneumatic vehicle tire,
wherein the ratio of the volume of the first layer of the material strip to the volume of the second layer of the material strip per winding is 1:1 to 10:1,
wherein a mean cross-sectional thickness per winding of the first layer of the material strip is 0.5 mm to 5 mm, and/or
wherein a mean cross-sectional thickness per winding of the second layer of the material strip is 0.5 mm to 5 mm.

8. The pneumatic vehicle tire of claim 1, wherein within the tread segment the interface between the first layer of the material strip and the second layer of the material strip comprises a mean slope angle per winding of −80° to 80° to the radial direction rR of the pneumatic vehicle tire,
wherein the ratio of the volume of the first layer of the material strip to the volume of the second layer of the material strip per winding is 1:1 to 10:1,
wherein a mean cross-sectional thickness per winding of the first layer of the material strip is 0.5 mm to 1 mm, and/or
wherein a mean cross-sectional thickness per winding of the second layer of the material strip is 0.5 mm to 1 mm.

9. The pneumatic vehicle tire of claim 1, wherein the pneumatic vehicle tire comprises two shoulder regions, wherein in one or in both shoulder regions, the tread comprises a tread segment and, axially to the inside relative to the tread segment, a further segment, arranged radially on the outside of the tread, and
wherein the volume density of the second rubber compound in the further segment is lower than the volume density of the second rubber compound in the tread segment.

10. The pneumatic vehicle tire of claim 9, wherein the volume density of the second rubber compound in the further segment is equal to 0.

11. The pneumatic vehicle tire of claim 1, wherein within the tread segment, the mean slope angle per winding that is enclosed by the interface between the first layer and the second layer of the material strip, and the radial direction rR, changes in the axial direction aR.

12. The pneumatic vehicle tire of claim 11, wherein the mean slope angle per winding increases in magnitude from axially on the inside to axially on the outside.

13. The pneumatic vehicle tire of claim 1, wherein the tread comprises two shoulder regions, each comprising one of the tread segments,
wherein the tread segments comprise a mean slope angle per winding, and
wherein the two tread segments differ in the sign of the mean slope angle thereof per winding that is enclosed by an interface between the first layer and the second layer of the respective material strip and the radial direction rR.

14. The pneumatic vehicle tire of claim 1, wherein the material strip comprises a third layer composed of a rubber compound different from the first rubber compound and the second rubber compound.

15. The pneumatic vehicle tire of claim 1, wherein the material strip extends over at least 80% of the axial width of the tread.

16. The pneumatic vehicle tire of claim 1, wherein the tire is a vehicle tire or a motorcycle tire, and wherein the tire is a winter tire.

17. A method for producing a pneumatic vehicle tire, which comprises:
extruding by co-extrusion or cutting a calendered multi-compound web of at least two rubber compounds to produce a material strip;
winding the material strip approximately helically in the circumferential direction of the pneumatic vehicle tire to form a tread segment arranged radially on the outside of the vehicle tire,
wherein, in the region of the tread segment, the material strip comprises at least a first layer and a second layer in the longitudinal direction of the material strip,
wherein the first layer of the material strip is formed from a first rubber compound and the second layer of the material strip is formed from a second rubber compound that is different from the first rubber compound,
wherein the first layer of the material strip and the second layer of the material strip connect the radially outer surface of the tread segment to the radially inner surface of the tread segment,
wherein in the vulcanized state, the first rubber compound and the second rubber compound comprise approximately the same Shore A hardness, determined at room temperature in accordance with DIN ISO 7619-1,
wherein in the vulcanized state, the first rubber compound and the second rubber compound differ in at least one additional physical property,
wherein the first rubber compound and the second rubber compound differ by at least 2% in the rebound resilience thereof, and wherein the rubber compound with the greater rebound resilience has a rebound resilience of 23% to 75% and the other rubber compound has a rebound resilience of 8% to 50%, in each case determined at room temperature in accordance with DIN 53512.

* * * * *